June 23, 1964 R. A. MATTHIESSEN 3,138,360
CONDUIT SUPPORT
Filed Sept. 11, 1961 3 Sheets-Sheet 2
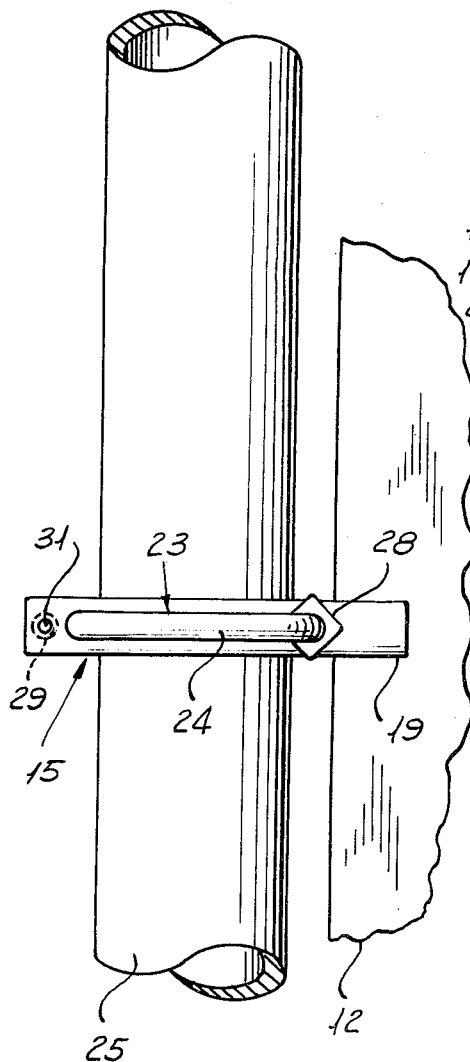
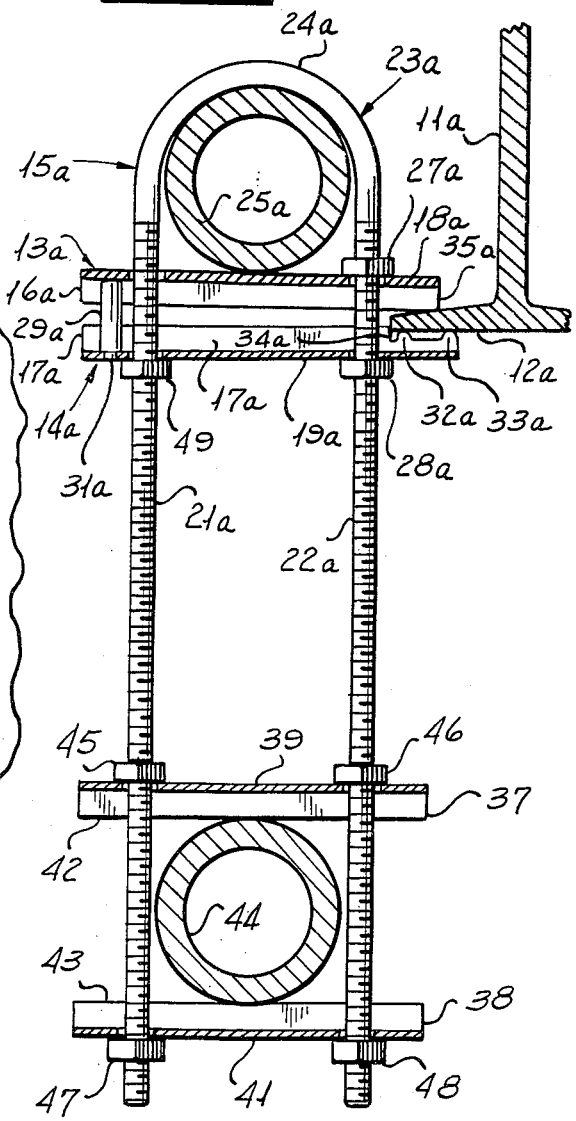
INVENTOR.
ROY A. MATTHIESSEN
BY
Harry B. Rook,
ATTORNEY

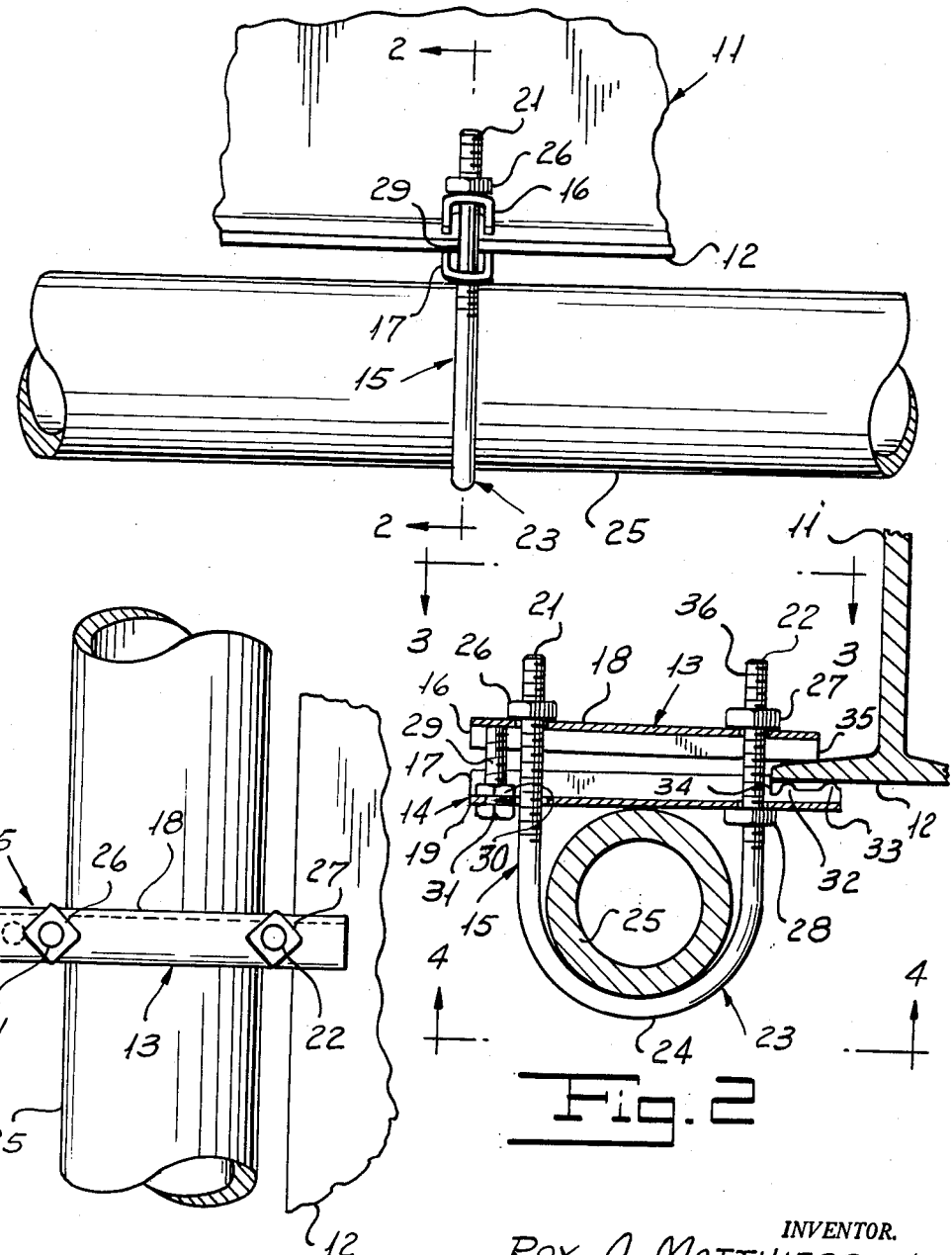

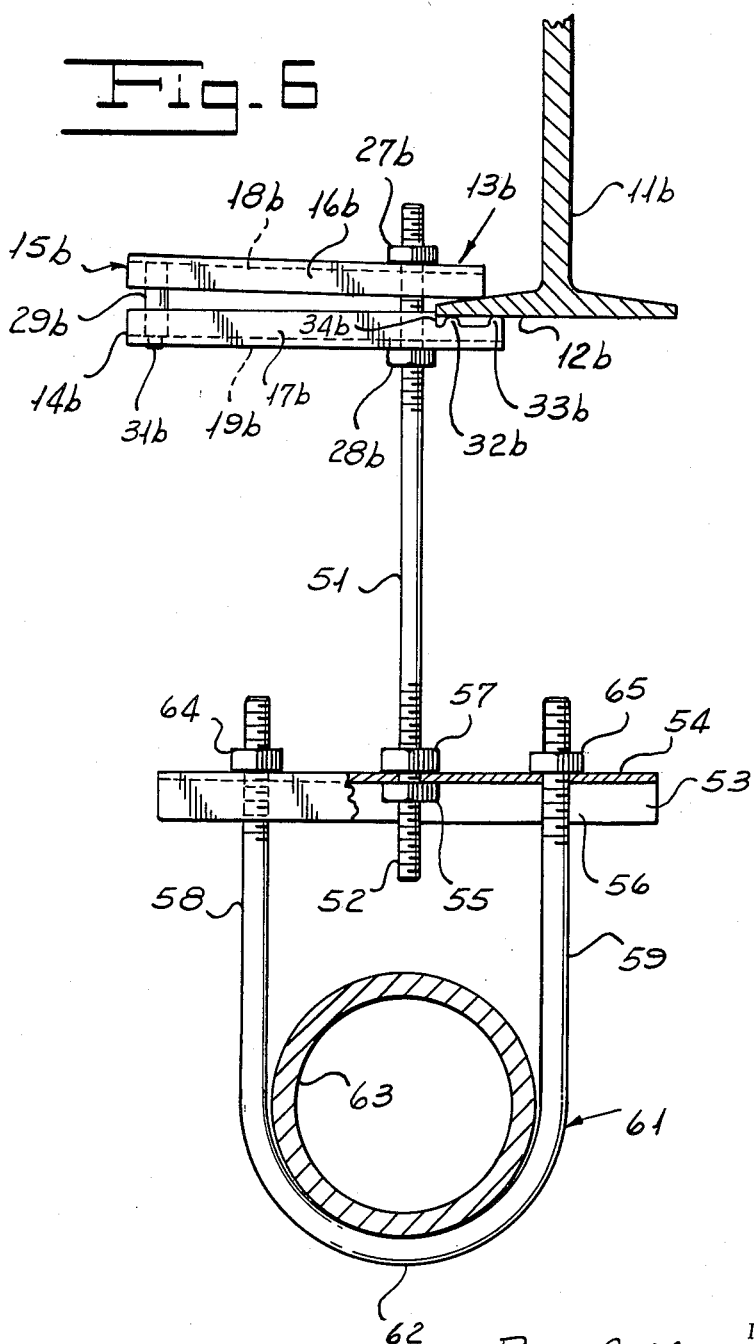

United States Patent Office 3,138,360
Patented June 23, 1964

3,138,360
CONDUIT SUPPORT
Roy A. Matthiessen, 30 Sandy Hill Road, Westfield, N.J.
Filed Sept. 11, 1961, Ser. No. 137,257
4 Claims. (Cl. 248—72)

This invention relates to clamps for supporting conduits and the like, and, more particularly, to such which are secured to the flanges of steel beams.

One method of supporting overhead conduits, pipes, and cables is to suspend them from structural members such as I-beams, channels and angle irons. It is to the means for connecting or clamping such supports to such structural members that the present invention is particularly directed.

An object of my invention is to provide an improved beam clamp for conduit supports and the like.

Another object of my invention is to provide such a beam clamp of simple, durable and easily applied parts.

A further object of my invention is to provide such a clamp with two jaws that may be tightened in position on the lower flange of a beam, and involving a supporting U-bolt with its outer leg loose so that the bolt is ready to receive a conduit in its loop portion, after which a nut on the outer leg of the bolt can be tightened to firmly clamp the conduit between the bolt and the lower jaw of the clamp.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a fragmentary side elevational view of an I-beam, to one of the lower flanges of which a clamp embodying my invention is secured and supports a conduit on the loop portion of a U-bolt thereof, the spreader member being omitted for clarity;

FIGURE 2 is a transverse sectional view of the line 2—2 of FIGURE 1, in the direction of the arrows;

FIGURE 3 is a fragmentary top plan of the beam flange, clamp and conduit supported thereby;

FIGURE 4 is a fragmentary bottom plan of the beam flange, clamp and conduit supported thereby;

FIGURE 5 is a transverse sectional view corresponding with FIGURE 2, but showing a modification; and FIGURE 6 is a transverse sectional view also corresponding with FIGURE 2, but illustrating the jaws of the clamp in elevation rather than in section and showing another modification.

Referring to the drawings in detail and first considering the embodiment of my invention shown in FIGURES 1 to 4 inclusive, there is shown a steel overhead I-beam 11 with a lower flange 12 about which the upper jaw 13 and the lower jaw 14 of a clamp, generally designated 15, are tightened. The jaws 13 and 14 are preferably steel channels with their flanges 16 and 17 directed or projecting toward one another. Their webs 18 and 19 are provided with registering apertures to respectively receive the outer and inner legs 21 and 22 of a U-bolt 23, the loop portion 24 of which holds a conduit or pipe 25.

The legs 21 and 22 of the U-bolt are respectively supported from the upper jaw 13 by nuts 26 and 27 threaded thereon and abutting the outer side thereof. The inner leg 22 of the U-bolt carries a lower nut 28 which abuts the outer side of the jaw and, upon tightening, serves to support the jaw and cause the ends of the jaws 13 and 14 which project toward the I-beam 11 and straddle the lower flange 12 thereof to tightly clamp thereon while pivoting about a spreader member 29 spacing the outer ends of said jaws. The member 29 is preferably adjustable and is desirably formed as a bolt which is slidable through a transverse aperture in the web of one jaw preferably the lower one, and is adjustably but rigidly secured to the jaw by the bolt head 31 and a nut 30 which grip the web between them.

The clamp jaw 14 desirably projects under the flange 12 a distance further than the jaw 13. Its flanges 17 are formed with teeth 32 and 33 on portions of reduced height beyond the shoulders 34 formed at the inner ends of the flange portions 17 of normal height. This gives a six point contact between the clamp jaws 13 and 14 and the flange 12, with the contacts 35, between the inner corners of the flanges 16, lying in a vertical plane parallel to the beam 11 and which act as teeth intermediate the teeth 32 and 33.

Such a construction and arrangement, as above described, results in the provision of means, such as the shoulders 34 which engage the flange 12 to limit the movement of the clamp 15 toward the beam 11. This prevents engagement between the outer edge of the flange 12 and the threads on the inner leg of the U-bolt 23. The relative positioning of the teeth 32, 33 and the toothed contacts 35 stabilizes the gripping action, and prevents angling, in a plane normal to the beam 11, of the clamp on the flange 12. The relatively sharp corners at the ends of the flange 16 bite into, and prevent slipping of said flanges along the inclined upper surface of the flange 12.

Referring now to the embodiment of my invention illustrated in FIGURE 5, there is shown an overhead steel I-beam 11a with a lower flange 12a about which the upper jaw 13a and lower jaw 14a of a clamp, generally designated 15a, are tightened. The jaws 13a and 14a, as in the previous embodiment, are preferably steel channels with their flanges 16a and 17a directed or projecting toward one another. Their webs 18a and 19a are provided with registering apertures to respectively receive the elongated outer and inner legs 21a and 22a of an inverted U-bolt 23a. The loop portion 24a of said bolt lies over and holds the conduit or pipe 25a, which in this instance rests on the top jaw 13a.

The legs 21a and 22a of the U-bolt depend below the lower jaw 14a and support a structure, in this instance, consisting of an upper channel 37 and a lower channel 38. The legs 21a and 22a pass through registering apertures in the webs 39 and 41 of said channels. The flanges 42 and 43 of said channels 37 and 38 project from said webs toward one another, that is, respectively downwardly and upwardly to engage another conduit 44. The conduit 44 may be clamped tightly between the channels 37 and 38 by tightening the upper nuts 45 and 46 and/or the lower nuts 47 and 48 threaded on the elongated legs 21a and 22a of said inverted U-bolt 23a.

The inverted U-bolt 23a is supported directly by the conduit 25a, as its loop portion 24a engages the top of said conduit. The inner leg 22a of the U-bolt carries an upper nut 27a and a lower nut 28a which upon tightening the latter, serve to cause the ends of the jaws 13a and 14a which project toward the I-beam 11a, and straddle a lower flange 12a thereof, to tightly clamp thereon while pivoting about a spreader member 29a spacing the outer ends of said jaws.

The member 29a may be identical with the member 29 but is shown as a cylindrical steel element, the ends of which are disposed between the respective flanges of the jaws 13a and 14a. The lower end is preferably formed with a projection 31a of smaller section, snugly received in a corresponding aperture in the web 19a.

The web 19a is engaged by nut 49 on which the lower jaw 14a is supported.

As in the preceding embodiment, the clamp jaw 14a desirably projects under the flange 12a a distance further than the jaw 13a. Its flanges 17a are formed with teeth, 32a and 33a on portions of reduced height beyond the shoulders 34a formed at the inner ends of the flange portion at normal height, thus giving a six point contact as described in connection with the first embodiment, including means engaging the flange 12a.

Thus the shoulders 34a engage the flange 12a to limit movement of the clamp 15a toward the beam 11a, preventing damage to the threads on the inner leg 22a, as well as properly positioning the clamp in respect to the beam. The relative positions of the teeth 32a and 33a and the tooth contacts 35a stabilize the gripping action and prevent angling and slipping, as described in connection with the first embodiment.

Referring now to the embodiment of my invention illustrated in FIGURE 6, there is shown a steel overhead beam 11b with a lower flange 12b about which the upper jaw 13b and the lower jaw 14b of a clamp, generally designated 15b, are tightened. The jaws 13b and 14b are desirably steel channels with the flanges 16b and 17b directed or projecting toward one another. Their webs 18b and 19b are provided with registering apertures which respectively receive a suspending bolt or threaded rod 51.

Said bolt 51 has threaded thereon an upper nut 27b and a lower nut 28b which respectively serve to support the rod from the jaw 13b and tighten the jaw 14b to grip the flange 12b about the spreader member 29b. The member 29b is desirably formed as a cylindrical steel element, the ends of which are disposed between the respective flanges 16b and 17b of the jaws 13b and 14b. One or both ends, desirably only the lower one, may be formed with a projection 31b of smaller section, snugly received in a corresponding aperture in the web 19b.

The lower end portion of the rod 51 is threaded, as indicated at 52, and carries a structural member, such as a channel 53, the web 54 of which is engaged by and supported on a nut 55 on said threaded portion 52. The flanges 56 of member 53, in this instance, are shown depending from the web 54, but the position of the member 53 may be reversed if desired. An upper nut 57 may be tightened on the upper surface of the web 54, as illustrated. The web 54 is also apertured to receive the legs 58 and 59 of a U-bolt 61. The loop portion 62 of the bolt 61 directly supports a conduit or pipe 63 disposed beneath the member 53. The support of the legs 58 and 59 of the bolt 61 is here provided by nuts 64 and 65 threaded onto the upper end portions of said bolt 61 and directly supported on the upper surface of the web 54.

The clamp jaw 14b desirably projects under the flange 12b a distance further than the jaw 13b. Its flanges 17b are, as in the preceding embodiments, desirably formed with teeth 32b and 33b on portion of reduced height beyond the shoulders 34b formed at the inner ends of the flange portions 17b of normal height. This gives a six point contact between the clamp jaws 13b and 14b and the flange 12b, as described in connection with the preceding embodiments, resulting in the limitation of movement of the clamp 15b toward the beam 11b, stabilizing the gripping action and preventing angling and slipping as previously described.

Although in the present embodiment, the supporting member 51 is described as a straght bolt or threaded rod 51, yet this is not essential as it may be the inner leg of a U-bolt. The outer leg of said bolt would then pass through the outer portions of the jaws 13b and 14b, as described in connection with the first embodiment, the legs 58 and 59 being correspondingly twisted to allow passage of the loop portion of said bolt by the leg 58.

To avoid circumlocution, the term U-bolt is used in the claims to include a true U-bolt as shown in FIGURES 1 and 5 and also equivalents thereof such as two rods having a crossbar connecting them to serve in the same manner as the looped portion of a U-bolt.

I claim:

1. A conduit support to be clamped to a beam flange comprising a U-bolt to hold the conduit on its loop portion and between the leg outer and that inner with respect to said flange, a pair of juxtaposed jaws spanning the distance between and with apertures through which pass the legs of said bolt, a spreader element between the portions of said jaws beyond the outer leg of said bolt, a lower nut on the other leg of said bolt and disposed below the lower of said jaws for its support, and upper nuts on the portions of both of said legs above the upper of said jaws, whereby portions of said jaws extending toward said flange from the flange-adjacent leg of said bolt, may be disposed respectively above and below said flange and clamped in place thereon about the spreader element as a fulcrum, by merely tightening on the upper nut on said flange-adjacent leg, leaving the other upper nut to be later tightened to clamp a supported conduit in place between the U-bolt and one of said jaws.

2. A conduit support to be clamped to a horizontal beam flange comprising a pair of juxtaposed clamp jaws having corresponding end portions to grip said flange, each of said jaws having two apertures spaced apart longitudinally of the jaw and in register with the apertures in the other jaw, a U-bolt each of whose legs extends through one aperture in one jaw and the registering aperture in the other jaw to directly hold the conduit between the looped portion of the U-bolt and one jaw, a spreader element between portions of said jaws at the side of said apertures opposite said end portions, a nut on the leg of the U-bolt nearer the first-mentioned ends of said jaws and disposed at the outer side of one jaw for supporting the jaw, a second nut on said leg of the U-bolt at the outer side of the other jaw, and a third nut on the other leg of the U-bolt to contact with the outer side of the second-mentioned jaw, whereby the end portions of said jaws may be respectively above and below said flange and clamped in place by merely tightening the second-mentioned nut and the U-bolt may be tightened about a conduit disposed between the looped portion of the U-bolt and one of the jaws upon tightening of the third nut after the clamp jaws have been clamped in place on the flange.

3. A conduit support as recited in claim 2 wherein the jaws are channels with facing flanges and the spreader element is disposed between the outer end portions thereof and between said flanges.

4. A conduit support as recited in claim 3 wherein at least one of said jaws is formed with teeth on the edges of its flanges to engage a surface of the beam.

References Cited in the file of this patent

UNITED STATES PATENTS

| | | |
|---|---|---|
| 1,604,590 | McNulty | Oct. 26, 1926 |
| 2,733,034 | Tormo | Jan. 31, 1956 |
| 2,972,007 | Zoeller | Feb. 14, 1961 |
| 3,006,589 | Drysdale | Oct. 31, 1961 |
| 3,017,174 | Reuter | Jan. 16, 1962 |